United States Patent
Zhang et al.

(10) Patent No.: US 8,118,899 B2
(45) Date of Patent: Feb. 21, 2012

(54) SELF-CLEANING DEVICE OF FILTERING NET OF AIR CONDITIONER

(75) Inventors: Zhichun Zhang, Qingdao (CN); Renzhen Chu, Qingdao (CN); Shouxin Zhang, Qingdao (CN); Yu Fu, Qingdao (CN); Fanqing Lin, Qingdao (CN); Yongfeng Lei, Qingdao (CN); Fuxian Zhang, Qingdao (CN); Qiyuan Yao, Qingdao (CN)

(73) Assignees: Haier Group Corporation, Shandong (CN); Qingdao Haier Air Conditioning Gen Corp., Ltd., Shandong (CN)

( * ) Notice: Subject to any disclaimer, the term of this patent is extended or adjusted under 35 U.S.C. 154(b) by 238 days.

(21) Appl. No.: 12/596,325

(22) PCT Filed: Oct. 18, 2007

(86) PCT No.: PCT/CN2007/002980
§ 371 (c)(1),
(2), (4) Date: Dec. 3, 2009

(87) PCT Pub. No.: WO2008/128401
PCT Pub. Date: Oct. 30, 2008

(65) Prior Publication Data
US 2010/0107575 A1    May 6, 2010

(30) Foreign Application Priority Data
Apr. 18, 2007    (CN) .......................... 2007 1 0097811

(51) Int. Cl.
*B01D 46/04* (2006.01)
(52) U.S. Cl. .............................. 55/283; 55/289; 55/296
(58) Field of Classification Search ............... 55/283, 55/289, 293, 294, 290, 300, 295, 302, 303; 95/278, 279; 210/391, 393, 394
See application file for complete search history.

(56) References Cited

U.S. PATENT DOCUMENTS
2,511,295 A * 6/1950 Roop .............................. 261/80
(Continued)

FOREIGN PATENT DOCUMENTS
CN        1584435 A    2/2005
(Continued)

OTHER PUBLICATIONS
International Search Report for PCT/CN2007/002980 completed Dec. 16, 2007.

*Primary Examiner* — Duane Smith
*Assistant Examiner* — Minh-Chau Pham
(74) *Attorney, Agent, or Firm* — Buchanan Ingersoll & Rooney PC

(57) ABSTRACT

A self-cleaning device of a filtering net of air conditioner is installed on a filtering frame in an air inlet of a dust spiral case of a package air conditioner and is disposed outside the filtering net. A filtering net guide rail with slots is installed on an upper frame and a lower frame. The filtering net is fixed on the filtering net frame by the slots of guide rails. The cleaning device of the filtering net includes a sweeping assembly with a brush, a drive motor fixed on the sweeping assembly, a transmission mechanism connected to the drive motor, a rack group installed on the left and right side of the filtering net, a dust collecting box installed under the filtering net for collecting dust, and a dust exchanging device is disposed between the dust collecting box and the filtering net. The drive motor connected with the transmission mechanism drives the sweeping assembly sliding up and down attached the filtering net along the rack group, thus dust is cleaned by the brush, then dust is put into the dust collecting box through the dust exchanging device. The device is easily loaded and unloaded, and used with less time and labor, the filtering net can be cleaned any time or on time.

4 Claims, 3 Drawing Sheets

U.S. PATENT DOCUMENTS

Figure 1:
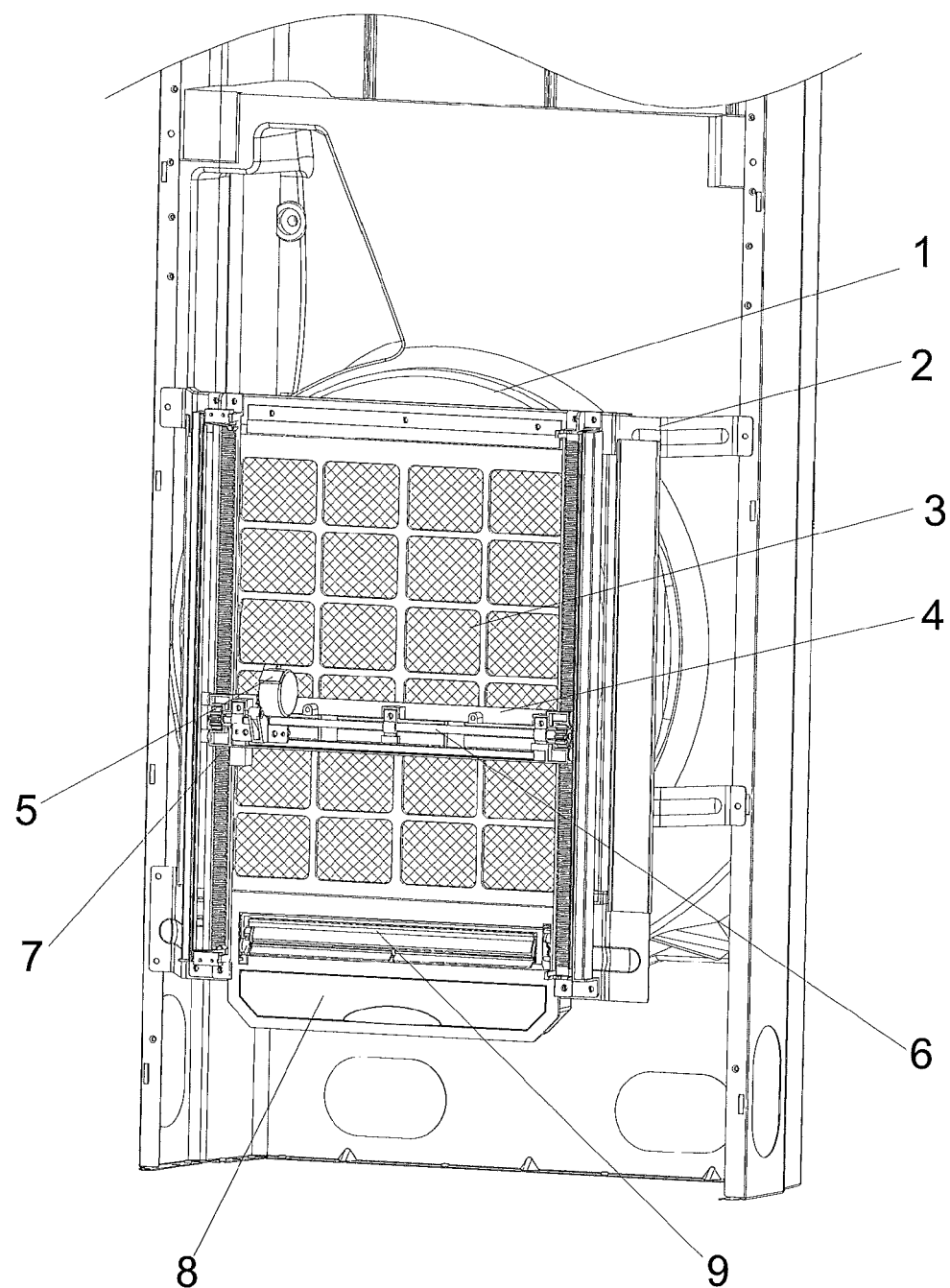

| | | | | |
|---|---|---|---|---|
| 3,487,620 A | * | 1/1970 | Klein et al. | 96/277 |
| 5,143,529 A | * | 9/1992 | Means, Jr. | 55/290 |
| 5,711,775 A | * | 1/1998 | Field et al. | 96/426 |
| 5,827,338 A | * | 10/1998 | Horvat | 55/285 |
| 5,906,752 A | * | 5/1999 | Williams | 210/783 |
| 6,117,200 A | * | 9/2000 | Berg et al. | 55/287 |
| 7,186,281 B2 | * | 3/2007 | Cheng | 55/289 |
| 2007/0060036 A1 | | 3/2007 | Shibuya et al. | |

FOREIGN PATENT DOCUMENTS

| | | |
|---|---|---|
| CN | 1759278 A | 4/2006 |
| CN | 1773185 A | 5/2006 |
| CN | 1873339 A | 12/2006 |
| CN | 1932396 A | 3/2007 |
| JP | 2004-44933 A | 2/2004 |

\* cited by examiner

SELF-CLEANING DEVICE OF FILTERING NET OF AIR CONDITIONER

FIELD OF THE INVENTION

The invention refers to a self-cleaning device of filtering net of an air conditioner, and in particularly to a cleaning device which can automatically clean the dust of the filtering net in the air inlet of the air conditioner independently.

BACKGROUND OF THE INVENTION

At present, the dedusting method of the ordinary split console air conditioner is primarily absorbing dust in air by using a filtering net set in the vicinity of the air inlet, but it will bring a great many negative effects that superabundant dust is accumulated in the filtering net. For example, the accumulated dust may jam the mesh of the filtering net, which would result in obstructing the ventilation capacity, decreasing the air volume of circulation through the heat exchanger, affecting the effect of cooling and heating, reducing the ability of air conditioner and increasing the running cost. Meanwhile the partial dust on the filtering net maybe again enter into the indoor air along the circulated air flow, which affects the quality of the indoor air, and does not meet the health function of the air conditioner, thus how to clean the filter net of the air conditioner has been a common problem concerned by the users and manufactures of air conditioner. In present market, the debusting method of the filtering net of the air conditioner is still cleaning by manual, after dust is accumulated in the filtering net with easily unpacking and cleaning structure, the filtering net is self-unpacked and cleaned by the users or service personnel. This method can certainly clean dust on the filtering net, however it needs frequently unpacking, washing, and maintaining, which would make the users waste a lot of time and labor. On this condition, both the domestic and oversea technologist in air condition plant make great efforts to work on the technical breakthrough of self-cleaning of air filtering net.

China Patent Application No. 200410057535.9 discloses a sort of dust absorption mode by dust absorption strip with suction holes, it can gather up the suction of a suction device into the suction port, and thus may maintain a strong suction. Meanwhile the suction location is changed by driving dust absorption and moving the suction port, so that the suction device scans on the air filtering net, which completes the whole region cleaning for the filtering net. However, the implementation way has high cost and great difficulty in the processing technology. The dust absorption strip is made of a thin plastic film, it is a highly difficult technique that the product with a certain shape is processed, and the dust absorption strip will also bear tension and friction during the process of driving, therefore the quality of the material of dust absorption strip is strictly required. Meanwhile the absorption strip need be guaranteed sealing with the outer part, and being concentric relative to the suction hole in the process of moving, therefore the machining precision is highly required. It is difficult to avoid that the absorption dust strip is worn out during the long-term operation.

China Patent Application No. 20061.0034955.4 discloses a self-cleaning device capable of automatically cleaning air filtering net positioned on air inlet side of an air condition indoor machine, the device includes the suction nozzle mechanism and the filtering net mechanism, the filtering net mechanism includes base seat, filtering net, filtering net frame, motor and its rotation drive mechanism, and suction nozzle mechanism comprises a suction nozzle frame and suction nozzle, the base seat is fixed on a dust spiral case, the filtering net is fixed on the filtering frame, the motor is installed on the base seat, the driving member of the rotation drive mechanism is connected with the output shaft of the motor, the filtering frame is installed on the driven member of the rotation drive mechanism, the suction nozzle frame with a dust absorptive port on the lower end is fixed on the base seat, the suction nozzle is installed on the suction nozzle frame, the suction nozzle is connected with the a dust absorption mechanism by a dust absorption pipe. The dust absorptive mode of the structure is rotating the filtering net to achieve dust absorptive effect by making the suction nozzle relatively move on the filtering net, however, since the rotation of the filtering net require a large power motor, which results in a larger noise, in addition the dust absorptive port is a relatively large spindly opening, and the opening is relatively larger, the absorptive effect is poor, so the debusting effect is not desired, particularly the effort of debusting on the region which is distant to the intermediate part of the filtering net is even worse.

In view of this, the present invention is provided.

SUMMARY OF THE INVENTION

The technical problems to be solved by the present invention is to overcome the technological deficiencies existing in prior arts, the present invention provides a self-cleaning device of a filtering net of an air conditioner with a filtering net without disassembly, which can be cleaned at any time, save time and labor, lower noise, and take good debusting effect.

In order to solve the above mentioned problem, the basic conception of the technical scheme of the present invention comprises: a self-cleaning device of a filtering net of an air conditioner, which is installed on a filtering net frame in an air inlet of a dust spiral case of a packaged air conditioner and is disposed outside of the filtering net, wherein, the self-cleaning device of the filtering net comprises a sweeping assembly with a brash, a drive motor fixed on the sweeping assembly, a transmission mechanism connected to the drive motor, a rack group installed on the left and right sides of the filtering net, a dust collecting box installed under the filtering net for collecting dust, and a dust exchanging device disposed between the dust collecting box and the filtering net, the drive motor connecting with the transmission mechanism drives the sweeping assembly sliding up and down, attached the filtering net along the rack group, thus dust is cleaned by the brush, then dust is put into the dust collecting box through the dust exchanging device.

The filtering net frame is fixed on an air inlet of the dust spiral case, a filtering net guide rail with slots is installed on the upper frame and lower frame, the filtering net is fixed on the filtering net frame by the slots of the guide rail.

The rack group comprises wrack installed on the right and left sides of the filtering net, a dustproof cover for rack respectively clamped with the rack, and a travel switch installed on the rack for limiting and holding up the sweeping assembly, the travel switch is located on the upper and lower part of the rack, the dustproof cover for rack can be covered on the rack to prevent dust, there is a space between the dustproof cover and the rack, relative to the lateral part of the filtering net.

The sweeping assembly includes a sweeping frame, a brush and a dustproof cover for sweeping assembly, the sweeping frame is transversely installed on the lateral part of the filtering net, the brush is fixed on the side of the frame near the filtering net, the sweeping frame located by sliding shafts set on the left and the right sides of the filtering net slides up and down to clean the dust, the sliding shaft is vertically fixed on the filtering frame.

The drive motor and the transmission mechanism are fixed on the sweeping frame. The transmission mechanism includes a drive shaft, transmission gears mounted on the two ends of the drive shaft, and a driven gear fixed by a shaft between the two ends, the transmission gears are respectively joggled with the racks of the two sides of the filtering net, the drive motor drives the driven shaft to rotate by the joggle of the drive gear with the driven gear, thus makes the sweeping assembly clean dust by sliding up and down on the rack along the sliding shaft, the dustproof cover is fastened on the lateral of the sweeping frame to prevent dust.

A dust collecting box frame is set under the filtering net, the frame is in a plane with the filtering net by externals, and has slots set on the upper and lower of it, the frame is "日" in shape, the dust collecting box is transversely located in the slots of the lower of the frame, the hatch of the dust collecting box is upward, the dust exchanging device is located in the upper slots with the external hatch of the dust collecting box frame, the hatch is outward, the dust brushed by the sweeping assembly is intercepted by the dust exchanging device to be put into the dust collecting box.

The dust exchanging device is a rectangular frame, a wool roll for adsorbing dust is transversely pin-jointed in the frame, the wool roll is of an oval column structure, and the wool roll has a reset mechanism which is made of a spring or an extensive spring, a block is disposed at the right and left sides of the wool roll.

A baffle is pin-jointed on the frame of the dust exchanging device in the direction of the wool roll, the baffle also has a reset mechanism which realizes the second dust exchange with a felt located on the side of the reset mechanism adjacent to the wool roll, a soft baffle is set under the wool roll along the tangent of the wool roll.

The cleaning movement of the whole device of the present invention is as follows: the drive motor rotates to drive the drive gear joggling with the driven gear, the driven gear rotates together with the transmission shaft as well as the two transmission gears on the two ends of transmission shaft, the two transmission gears joggle with the rack of the two sides of the filtering net respectively, all of the racks are fixed on the frame, which makes the whole sliding assembly slide up and down, the brush of the sweeping assembly cleans the dust adhered on the filtering net, the sweeping assembly continues to slide downwards and passes through the dust exchanging device, the dust is absorbed and blocked in turn by the wool roll and the soft baffle, after passing through the dust exchanging device, the sweeping assembly is blocked by the travel switch at the lower end of the rack, when the sweeping assembly returns and passes the dust exchanging device, the left and right blocks located on the left and right sides of the dust exchanging device are driven to rotate, and the wool roll and the soft baffle are driven to rotate, then, the dust is put into the dust collecting box, the residual dust on the wool roll is once again cleaned by the block through the wool roll and the soft baffle being revolved reposition by the spring or extension spring, the reset wool roll and soft baffle seal the hatch of the dust collecting box, thus prevents the dust from running out.

After adopting of the above technical scheme, compared with the prior art, the beneficial effects of the present invention are as follows:

The cleaning device of the present invention drives the frame with the brush to slide up and down by the gear, the rack and the driven mechanism, the brush cleans the dust absorbed on the surface of the filtering net, the brush puts the dust from the filtering net into the dust collecting box set under the filtering net. The users could clear the dust in the dust collecting box in a long time interval. The filtering net of the cleaning device can be cleaned any time or on time, which guarantees the cleanness of the filtering net and the working quality of the air conditioner, and the air from the air conditioner to be fresh for ever. The device is easily loaded and unloaded, and used with less time and labor, the filtering net can be cleaned any time or on time. In addition, the brush set transversely on the filtering net can dedust in a large-scale, the dust can not be leaven behind, the dedusting effect is well, moreover only the drive motor is located on the sweeping assembly, the sweeping assembly slides up and down along the sliding shaft with a small noise.

The embodiment of the present invention is described in detail as follows in combination with the drawings.

DETAILED DESCRIPTION OF THE DRAWINGS

Figure 2:
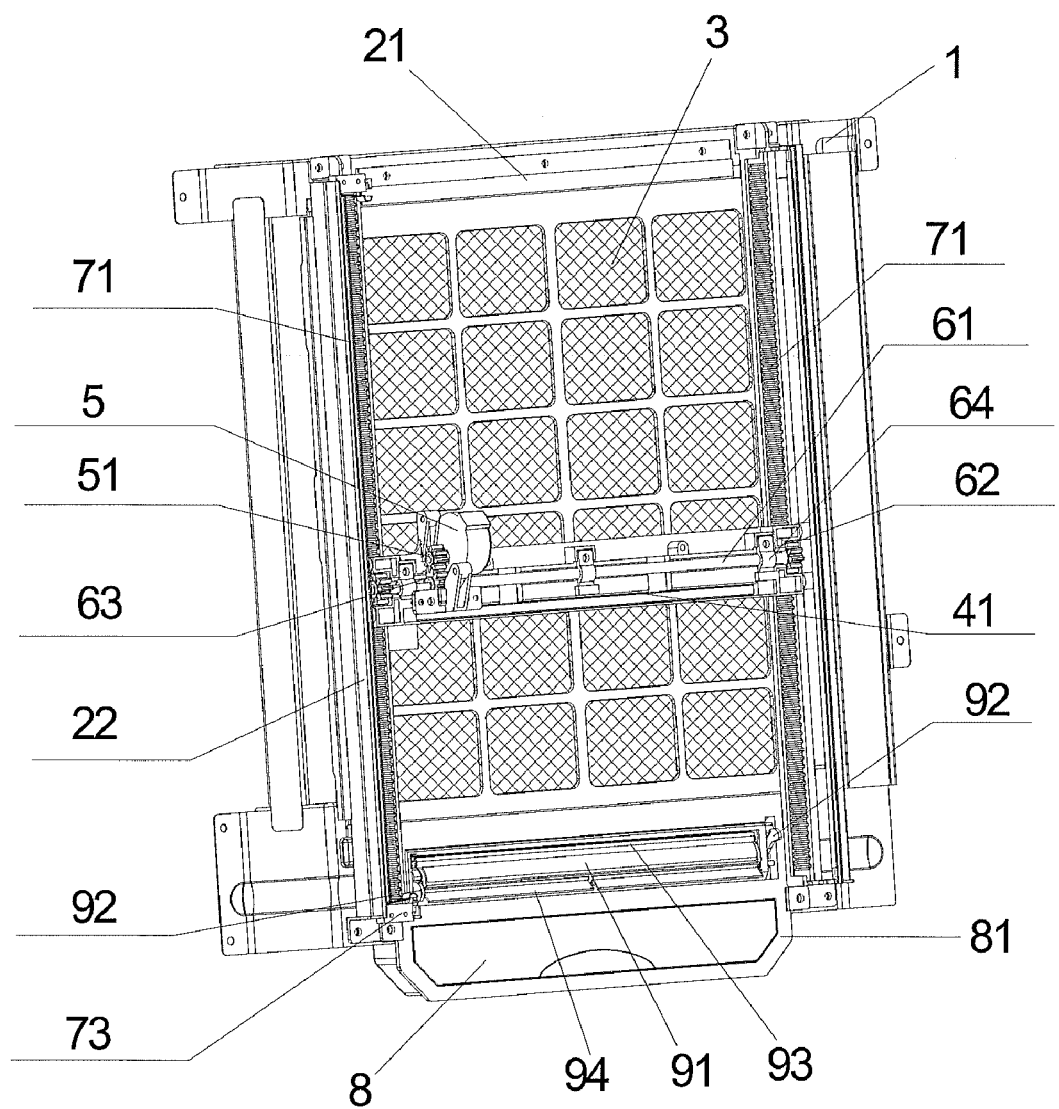
Figure 3:
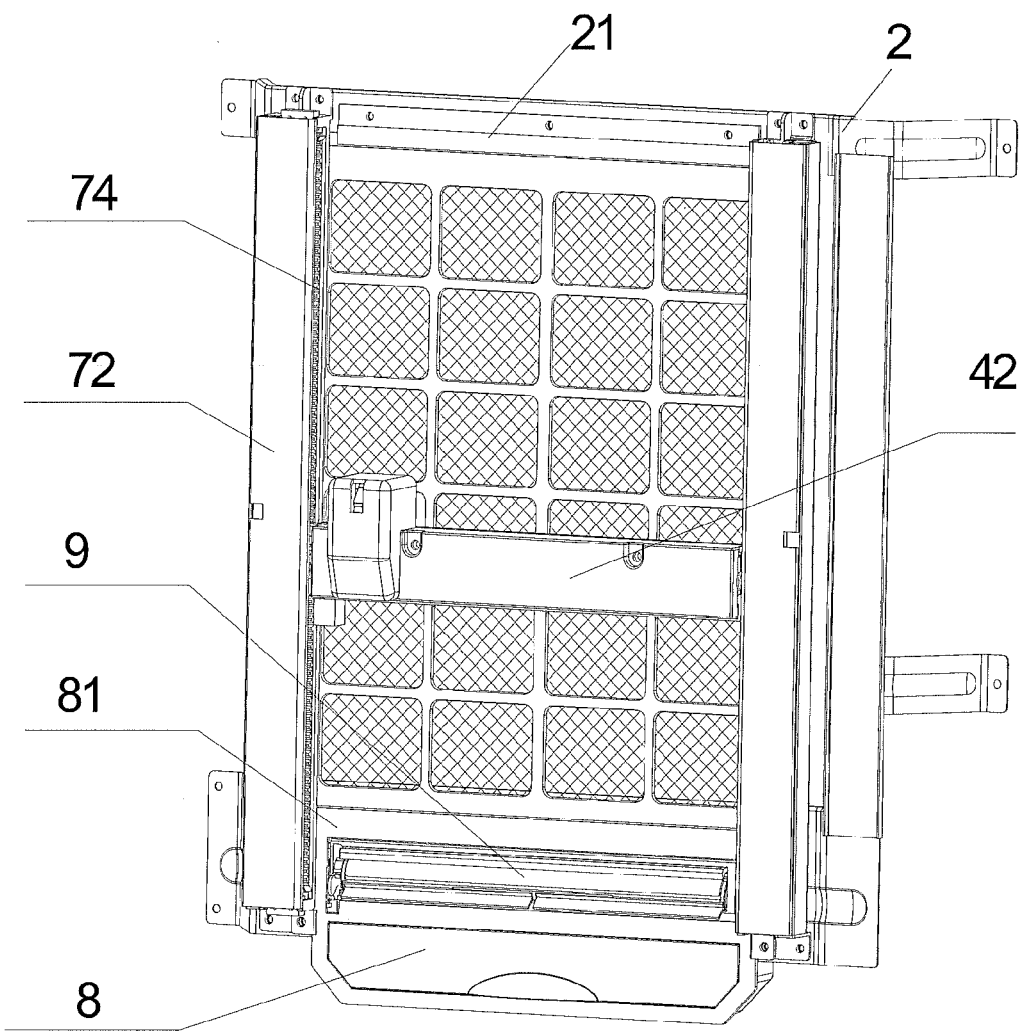

FIG. 1 a schematic view of the self-cleaning device of the filtering net of the air conditioner installed on the air conditioner;

FIG. 2 a schematic view of the self-cleaning device of the filtering net of the air conditioner;

FIG. 3 a schematic view of the self-cleaning device of the filtering net of the air conditioner installed the dustproof cover

EMBODIMENT

As FIG. 1 shown, the self-cleaning device of the filtering net of the air conditioner of the present invention is installed on the filtering frame 2 in the air inlet of the dust spiral case 1 of the package air conditioner and is disposed outside of the filtering net 3, the filtering net frame 2 is fixed on the air inlet of the dust spiral case 1, the filtering net guide rail 21 with slots is installed on the upper and the lower frame, the filtering net 3 is fixed on the filtering net frame 2 by the slots of the guide rail, During the running of the air conditioner, the air is absorbed into the dust spiral case through the filtering net by blower, and passes through heat exchanger to enter the room, but the dust in air is absorbed on the filtering net, after running some time, the swept dust is put into the dust collecting box by controlling the running of the self-cleaning device of the filtering net by mechanic or manual.

The self-cleaning device comprises the sweeping assembly 4 with the brush, the drive motor 5 fixed on the sweeping assembly 4, and the transmission mechanism 6 connected to the drive motor 5, the rack group 7 installed on the left and right sides of the filtering net 3, the dust collecting box 8 disposed under the filtering net 3 for collecting dust, and the dust exchanging device 9 disposed between the dust collecting box 8 and the filtering net 3, the drive motor 5 connecting with the transmission mechanism 6 drives the sweeping assembly 4 sliding up and down attached the filtering net along the rack group 7, thus dust is cleaned by the brush, then dust is put into the dust collecting box 8 by the dust exchanging device 9.

The sweeping assembly 4 comprises the sweeping frame 41, the brush and the dustproof cover 42, the sweeping frame 41 is transversely installed on the lateral part of the filtering net 3, the brush is fixed on the side of the frame 41 near the filtering net 3 (not shown in the FIG.), the sweeping frame 41 located by the sliding shaft 22 set on the left and the right of the filtering net 3 slides up and down to clean the dust, the sliding shaft 22 is vertically installed on filtering net frame 2. Or the sweeping frame located by the slots set on the inside of the rack slides along the slot.

The rack group 7 comprises the rack 71 installed on the right and left sides of the filtering net 3, the dustproof cover 72 for rack clamped with the rack respectively, the travel switch 73 installed on the rack 71 for limiting and holding up the sweeping assembly 4, the travel switch 73 is located on the upper and lower part of the rack 71, the dustproof cover 72 for rack can be covered on the outside of the rack 71 to prevent the dust, there is a space 74 between the dustproof cover 72 and the rack 71, relative to the lateral part of the filtering net. The sliding shaft 22 is installed the outside of the rack 71 in parallel, the sliding shaft 22 is also in the inner of the dustproof cover 72, and the spacing 74 between the dustproof cover 72 and the rack 71 is a space for sliding up and down for the sweeping frame 41. In the present invention, the two travel switches are located on the two sides of the rack (shown as FIG. 2)

The drive motor 5 and the transmission mechanism 6 are fixed on the sweeping frame 4, the transmission mechanism 6 includes the drive shaft 61, the transmission gear 62 mounted on the two ends of the drive shaft 61 and the driven gear fixed by a shaft between the two ends, and the drive shaft 61 is rotatablely fixed on the sweeping frame 4 by multiple attaching clamps 64, the transmission gears 62 joggle with the racks 71 set on the two sides of the filtering net respectively, the drive motor 5 drives the driven shaft 61 to rotate by the joggle of the drive gear 51 with the driven gear 63, thus makes the sweeping assembly clean dust by sliding up and down on the rack 71 along the sliding shaft 22, the dustproof cover 42 is fastened on the lateral of the sweeping frame 41 to prevent the dust.

The dust collecting box frame 81 is set under the filtering net 3, the frame 81 is in a panel with the filtering net 3 by externals, and has slots set on the upper and lower of the frame, the frame is "日" in shape, the dust collecting box 8 is transversely located in the lower slots, the hatch of the dust collecting box is upward, the dust exchanging device 9 is located in the upper slots of dust collecting box frame 81 with the external hatch, the hatch is outward, the dust brushed by the sweeping assembly is intercepted by the dust exchanging device to put into the dust collecting box. The dust exchanging device 9 is a rectangular frame, the wool roll 91 for absorbing dust is transversely pin-jointed in the frame, the wool roll is an oval column structure, and the wool roll has a reset mechanism which is made of a spring or an extensive spring, the block 92 is disposed at the right and left sides of the wool roll.

The baffle 93 is pin-jointed on the frame of the dust exchanging device in the direction of the wool roll 91, the baffle 93 also has a reset mechanism which realizes the second dust exchange with the felt located on the side of the reset mechanism adjacent to the wool roll, the soft baffle 94 is set under the wool roll along the tangent of the wool roll.

The condition that the sweeping assembly finishes the concrete movement of the above structure must be met: the distance between the two travel switches can not be less than the distance between the upper side of the filtering net and the lower side of the dust exchanging device.

The cleaning movement of the whole device of the present invention is as follows: the drive motor rotates to drive the drive gear joggling with the driven gear, the driven gear rotates together with the transmission shaft as well as the two transmission gears on the two ends of transmission shaft, the two transmission gears joggle with the rack of the two sides of the filtering net respectively, all of the racks are fixed on the frame, which makes the whole sliding assembly slide up and down, the brush of the sweeping assembly cleans the dust adhered on the filtering net, the sweeping assembly continues to slide downwards and passes through the dust exchanging device, the dust is absorbed and blocked in turn by the wool roll and the soft baffle, after passing through the dust exchanging device, the sweeping assembly is blocked by the travel switch at the lower end of the rack, when the sweeping assembly returns and passes the dust exchanging device, the left and right blocks located on the left and right sides of the dust exchanging device is driven to rotate, and the wool roll and soft baffle are driven to rotate, then, the dust is put into the dust collecting box, the residual dust on the wool roll is once again cleaned by the block through the wool roll and the soft baffle being revolved reposition by the spring or extension spring, the reset wool roll and soft baffle seal the hatch of the dust collecting box, thus prevents the dust from running out.

After adopting of the above technical scheme, compared with the prior art, the beneficial effects of the present invention are as follows:

The cleaning device of the present invention drives the frame with the brush to slide up and down by the gear, the rack and the driven mechanism, the brush cleans the dust absorbed on the surface of the filtering net, the brush puts the dust from the filtering net into the dust collecting box set under the filtering net. The users could clear the dust in the dust collecting box in a long time interval. The filtering net of the cleaning device can be cleaned any time or on time, which guarantees the cleanness of the filtering net and the working quality of the air conditioner, and the air from the air conditioner to be fresh for ever. The device is easily loaded and unloaded, and used with less time and labor, the filtering net can be cleaned any time or on time.

The invention claimed is:

1. A self-cleaning device of a filtering net of an air conditioner, which is to be installed on a filtering net frame in an air inlet of a dust spiral case of a packaged air conditioner and is to be disposed outside of the filtering net, wherein, the self-cleaning device of the filtering net comprises a sweeping assembly with a brush, a drive motor fixed on the sweeping assembly, a transmission mechanism connected to the drive motor, a rack group installed on the left and right sides of the filtering net, a dust collecting box to be under the filtering net for collecting dust, and a dust exchanging device disposed between the dust collecting box and the filtering net, the drive motor connecting with the transmission mechanism drives the sweeping assembly to slide up and down the filtering net along the rack group, so that dust is cleaned by the brush and is then is put into the dust collecting box through the dust exchanging device, wherein the sweeping assembly includes a sweeping frame, a brush and a sweeping assembly dustproof cover, the sweeping frame is transversely installed on the lateral part of the filtering net, the brush is fixed on the side of the sweeping frame adjacent the filtering net, the sweeping frame movable via sliding shafts set on the left and the right sides of the filtering net and slides up and down to clean the dust, the sliding shafts being vertically fixed on the filtering frame, the drive motor and the transmission mechanism are fixed on the sweeping frame, the transmission mechanism includes a drive shaft, transmission gears mounted on the two ends of the drive shaft, and a driven gear fixed between the two ends of the drive shaft, the transmission gears are respectively joggled with the rack group on the left and right sides of the filtering net, the drive motor drives the driven shaft to rotate by the joggle of the drive gear with the driven gear, thus making the sweeping assembly clean dust by sliding up and down on the rack group along the sliding shafts, and the sweeping assembly dustproof cover is fastened on a lateral side of the sweeping frame to prevent dust on the sweeping assembly, a dust collecting box frame is set to be under the filtering net, the dust collecting box frame is in a plane with the filtering net and has an upper slot and lower slot, the dust collecting box frame is "日" in shape, the dust collecting box is transversely located in the lower slot of the dust collecting box frame, the dust collecting box having a hatch disposed upward, the dust exchanging device is located in the upper slot of the dust collecting box frame, the hatch is outside, the dust brushed by the sweeping assembly is intercepted by the dust exchanging device to be put into the dust collecting box, the dust exchanging device is a rectangular frame, a wool roll for absorbing dust is transversely pin-jointed in the rectangular frame, the wool roll is of an oval column structure, and the wool roll has a reset mechanism which is made of a spring or an extensive spring, and a block is disposed at each of the right and left sides of the wool roll, and a baffle is pin-jointed on the rectangular frame in the direction of wool roll, the baffle also has a reset mechanism which realizes a second dust exchange with a felt located on a side of the reset mechanism adjacent to the wool roll, and a soft baffle is set under the wool roll along a tangent of the wool roll.

2. A self-cleaning device of a filtering net of an air conditioner according to claim 1, wherein the filtering net frame is fixed on an air inlet of the dust spiral case, a filtering net guide rail with slots is installed on an upper part and lower part of the filtering net frame, and the filtering net is fixed on the filtering net frame by the slots of the filtering net guide rail.

3. A self-cleaning device of a filtering net of an air conditioner according to claim 1, wherein the rack group comprises a rack installed on each of the right and left sides of the filtering net, a rack dustproof cover respectively clamped with each rack, and a travel switch installed on at least one rack for limiting and holding up the sweeping assembly, the travel switch is located on the upper and lower part of the at least one rack, the rack dustproof cover to prevent dust on a respective rack, and there is a space between the rack dustproof cover and the respective rack, relative to a lateral part of the filtering net.

4. A self-cleaning device of a filtering net of an air conditioner according to claim 1, wherein the self-cleaning device controls exchanging movement of the dust is as follows: the drive motor rotates to drive the drive gear joggling with the driven gear, the driven gear rotates together with the transmission shaft as well as the two transmission gears, the two transmission gears joggle with the rack group on left and right sides of the filtering net respectively, the rack group being fixed on the filtering net frame, which makes the whole sliding assembly slide up and down, the brush of the sweeping assembly cleans the dust adhered on the filtering net, the sweeping assembly continues to slide downwards and passes through the dust exchanging device, the dust is absorbed and blocked in turn by the wool roll and the soft baffle, after passing through the dust exchanging device, the sweeping assembly is blocked by the travel switch at the lower end of the rack group, and when the sweeping assembly returns and passes the dust exchanging device, the left and right blocks located on the left and right sides of the dust exchanging device are driven to rotate, and the wool roll and the soft baffle are driven to rotate, the dust is then put into the dust collecting box, residual dust on the wool roll is once again cleaned by the blocks through the wool roll and the soft baffle being revolved reposition by the spring or extension spring, and the reset wool roll and soft baffle seal the hatch of the dust collecting box to prohibit the dust from falling out.

* * * * *